United States Patent
Schult et al.

(10) Patent No.: US 10,364,802 B2
(45) Date of Patent: Jul. 30, 2019

(54) HEATING A WIND TURBINE FACILITY

(71) Applicant: ABB Technology Oy, Helsinki (FI)

(72) Inventors: Matthias Schult, Mülligen (CH);
Stephan Ebner, Wutöschingen (DE);
Christian Schlegel, Uitikon (CH);
Dominik Flum, Weilheim (DE)

(73) Assignee: ABB Schweiz, Baden (CH)

( * ) Notice: Subject to any disclaimer, the term of this patent is extended or adjusted under 35 U.S.C. 154(b) by 0 days.

(21) Appl. No.: 16/055,320

(22) Filed: Aug. 6, 2018

(65) Prior Publication Data
US 2018/0340519 A1    Nov. 29, 2018

Related U.S. Application Data

(63) Continuation of application No. PCT/EP2017/052355, filed on Feb. 3, 2017.

(30) Foreign Application Priority Data

Feb. 5, 2016 (EP) .................................... 16154509

(51) Int. Cl.
*F03D 7/02* (2006.01)
*F03D 7/04* (2006.01)
*F03D 80/60* (2016.01)

(52) U.S. Cl.
CPC ........... *F03D 80/60* (2016.05); *F03D 7/0284* (2013.01); *F03D 7/04* (2013.01); *F05B 2220/60* (2013.01);
(Continued)

(58) Field of Classification Search
USPC .............................. 290/44, 55; 363/37; 416/1
See application file for complete search history.

(56) References Cited

U.S. PATENT DOCUMENTS 5,953,224 A * 9/1999 Gold ....................... H02M 1/08
363/14
7,476,987 B2 * 1/2009 Chang ....................... H02J 3/28
290/55
(Continued)

FOREIGN PATENT DOCUMENTS

DE   102009054374 A1   5/2011
EP       1840090 A2   10/2007
(Continued)

OTHER PUBLICATIONS

European Patent Office, International Search Report & Written Opinion issued in corresponding Application No. PCT/EP2017/052355, dated May 8, 2017, 13 pp.
(Continued)

*Primary Examiner* — Pedro J Cuevas
(74) *Attorney, Agent, or Firm* — Taft Stettinius & Hollister LLP; J. Bruce Schelkopf

(57) ABSTRACT

A method for heating a wind turbine facility includes: charging a DC link of an electrical converter connected with a wind turbine of the wind turbine facility; heating air inside the wind turbine facility with heat generated by a voltage limiting unit interconnected with the DC link, which includes a resistor adapted for dissipating electrical energy into heat for reducing a voltage in the DC link, when the voltage is above a threshold voltage; wherein the voltage limiting unit is controlled, such that the voltage limiting unit generates heat according to settings defined in a controller of the voltage limiting unit. The heating settings are changed based upon commands from a user interface. Furthermore, the DC link is charged by a grid side converter of the wind turbine facility with power from an electrical grid.

20 Claims, 2 Drawing Sheets

(52) U.S. Cl.
CPC ....... *F05B 2260/20* (2013.01); *F05B 2260/64* (2013.01); *F05B 2270/10711* (2013.01); *F05B 2270/325* (2013.01); *Y02E 10/723* (2013.01); *Y02T 50/675* (2013.01)

(56) References Cited

U.S. PATENT DOCUMENTS

| | | | | |
|---|---|---|---|---|
| 7,573,732 | B2* | 8/2009 | Teichmann | H02M 1/32 363/51 |
| 7,637,715 | B2* | 12/2009 | Battisti | F03D 80/40 290/55 |
| 8,348,609 | B2* | 1/2013 | Haraguchi | F03D 7/0212 416/1 |
| 8,587,974 | B2* | 11/2013 | Jonsson | H02P 27/08 363/132 |
| 8,981,584 | B2* | 3/2015 | Banham-Hall | F03D 7/0224 290/44 |
| 9,099,933 | B2* | 8/2015 | Jones | H02M 5/42 |
| 9,228,566 | B2* | 1/2016 | Pasteuning | F03D 80/60 |
| 9,621,088 | B2* | 4/2017 | Niemoeller | H02P 9/08 |
| 2007/0246943 | A1* | 10/2007 | Chang | H02J 3/28 290/44 |
| 2008/0174116 | A1 | 7/2008 | Peterschmidt et al. | |
| 2008/0291708 | A1* | 11/2008 | Teichmann | H02M 1/32 363/50 |
| 2010/0068984 | A1* | 3/2010 | Hansson | H05B 1/0244 454/184 |
| 2010/0189560 | A1* | 7/2010 | Haraguchi | F03D 7/0212 416/1 |
| 2011/0018521 | A1* | 1/2011 | Jonsson | H02M 7/53873 323/311 |
| 2012/0133342 | A1 | 5/2012 | Murata | |
| 2012/0147633 | A1* | 6/2012 | Jones | H02M 5/42 363/37 |
| 2012/0147634 | A1* | 6/2012 | Jones | H02M 1/32 363/37 |
| 2013/0028738 | A1* | 1/2013 | Nordin | H05B 3/145 416/39 |
| 2013/0207394 | A1* | 8/2013 | Banham-Hall | F03D 7/0224 290/44 |
| 2014/0056706 | A1* | 2/2014 | Laurberg | F03D 7/042 416/1 |
| 2014/0091572 | A1* | 4/2014 | Jepsen | F03D 7/026 290/44 |
| 2015/0023792 | A1* | 1/2015 | Spitzner | F03D 80/40 416/1 |
| 2015/0042094 | A1 | 2/2015 | Beekmann | |
| 2015/0145251 | A1* | 5/2015 | Wagoner | F03D 7/0272 290/44 |
| 2015/0244297 | A1* | 8/2015 | Niemoeller | H02P 9/08 290/44 |
| 2017/0370993 | A1* | 12/2017 | Weinberg | H02P 11/00 |
| 2018/0335014 | A1* | 11/2018 | Achenbach | F03D 7/026 |

FOREIGN PATENT DOCUMENTS

| | | |
|---|---|---|
| EP | 1959133 A2 | 8/2008 |
| EP | 2270331 A2 | 1/2011 |
| WO | 2013135504 A1 | 9/2013 |

OTHER PUBLICATIONS

European Patent Office, Extended Search Report issued in corresponding Application No. 16154509.0, dated Aug. 12, 2016, 7 pp.

* cited by examiner

HEATING A WIND TURBINE FACILITY

FIELD OF THE INVENTION

The invention relates to a method for heating a wind turbine facility and to a heating system for a wind turbine facility. Furthermore, the invention relates to a wind turbine facility and to a use of a voltage limiting unit for heating an interior of a wind turbine facility.

BACKGROUND OF THE INVENTION

Usually, a wind turbine facility comprises a tower, which carries a nacelle with the wind turbine and a generator. A converter of the wind turbine facility is usually positioned inside the tower, for example directly on or shortly above a basement, on which the tower is erected.

The converter usually comprises a grid side converter and a generator side converter, which are coupled by a DC link. This DC link usually is interconnected with a voltage limiting unit, which stabilizes and balances the DC link during disturbances or low voltage ride throughs. The voltage limiting unit comprises a resistor, which may be electrically connected to the DC link for converting electrical energy from the DC link irreversibly to thermal energy (i.e. heat) which may be radiated to the environment.

During a low voltage ride through (in which the voltage in a grid supplied by the wind turbine facility decreases) it is usually not possible to feed all the energy from the generator to the grid. On the other hand, during a low voltage ride through, a torque reference for the generator may not be substantially changed to avoid torque jumps which may lead to gearbox damages and heavy oscillations. These two requirements may result in a voltage limiting unit with huge thermal capacity to absorb the full power from the generator for a couple of seconds. During this, the resistor of the voltage limiting unit may heat up to several hundred degrees Celsius.

US 2012/0133342 A1 describes a liquid resistor filled with seawater for a voltage limiting unit.

DE 102009054374 A1 describes to reuse the thermal energy from a voltage limiting unit by using a temperature difference between voltage limiting unit and the environment to create a supply voltage with a thermal element for a cooling fan.

WO 2013/135504 A1 relates to controlling a wind turbine, when the grid is no available. A heating device is mentioned, which is provided by chopper resistors of a converter. The generated heat may be used for heating a lower part of a tower of the wind turbine. A control board for controlling the chopper resistors is mentioned.

EP 2 270 331 A2 relates to power management of a wind turbine during grid faults. It is described, how surplus power may be dissipated with a resistive element connected to a DC link of the converter of the wind turbine.

DESCRIPTION OF THE INVENTION

It is an object of the invention to better utilize the equipment of a wind turbine facility. It is a further object of the invention to protect equipment of a wind turbine facility from cold and humidity.

These objectives are achieved by the subject-matter of the independent claims. Further exemplary embodiments are evident from the dependent claims and the following description.

An aspect of the invention relates to a method for heating a wind turbine facility. The wind turbine facility may comprise interior space and/or interior rooms, for example in a wind turbine tower, and the method may be used of heating this interior space and/or interior rooms.

According to an embodiment of the invention, the method comprises: charging a DC link of a converter of a wind turbine of the wind turbine facility; heating air inside the wind turbine facility with heat generated by a voltage limiting unit interconnected with the DC link, which voltage limiting unit comprises a resistor adapted for dissipating electrical energy into heat for reducing a voltage in the DC link, when the voltage is above a threshold voltage; wherein the voltage limiting unit is controlled, such that the voltage limiting unit generates heat according to heating settings defined in a controller of the voltage limiting unit, when the voltage is below the threshold voltage.

The heating settings may be ambient heating settings, for example heating settings that are used for controlling a temperature inside the wind turbine facility, for example inside the above mentioned space and/or room. The term "ambient heating" may refer to controlling the voltage limiting unit is such a way that it generates a defined temperature and/or a defined heat power.

In other words, the voltage limiting unit, which is used and provided for protecting a DC link from overvoltage and/or meeting standards and technical limitation of the wind turbine facility, may be used for a further purpose, i.e. heating of the wind turbine facility.

It has to be noted that this heating may be performed independently from the threshold voltage, at which the voltage limiting unit is used for protecting the DC link. For example, when the protection function is not needed (for example there is no low voltage ride through), the voltage limiting unit may provide an ambient heating function and may be controlled to dissipate heat, such that the heating settings are met (such as a specific ambient/room temperature). When the protection function is needed, the voltage limiting unit may be used for dissipating much more energy and may heat up much more than during the ambient heating. Summarized, the voltage limiting unit may have a heating mode and a protection mode.

The control method allows using only already existing components of a wind turbine facility, for example to heat up an interior of a wind turbine tower.

For example, the voltage limiting unit may comprise a resistor and a semiconductor switch for connecting the voltage limiting unit to the DC link (for example in parallel to a DC link capacitor). A controller of the converter may control the voltage limiting unit by switching on and off the semiconductor switch. By switching the switching on and off with a specific frequency, the power dissipated by the resistor may be set. In such a way, the temperature and/or the heating power of the resistor may be set.

The voltage limiting unit may comprise cooling fins in thermal contact, which are thermally connected with the resistor. These cooling fins may be used for heating air inside the wind turbine facility, which then, for example by thermal convection, is distributed inside the interior of the wind turbine facility.

With the heating settings, which may be predefined in the controller or which may be changed during the operation of the wind turbine, several heating conditions inside the wind turbine facility may be met. These settings may influence a temperature inside the wind turbine facility, for example for ambient heating, freezing protection, drying or anti-condensation.

According to an embodiment of the invention, the voltage limiting unit is controlled, such that the resistor is heated to a defined heating temperature. One possibility for ambient heating is to control the voltage limiting unit such that it has a substantially constant temperature over a rather long time, for example for more than 10 minutes.

According to an embodiment of the invention, the heating temperature is lower than a maximal temperature, which maximal temperature is used for limiting a temperature of the resistor during reducing the voltage in the DC link, when the voltage is above a threshold voltage. It has to be noted that the heating temperature may be much lower than the temperature that may be reached during protection, which may be above 500° C. For example, during ambient heating, the voltage limiting unit is controlled, such that the heating temperature of the resistor is between 10° and 80°.

According to an embodiment of the invention, the voltage limiting unit is controlled, such that the resistor generates heat with a defined heating power. Another possibility is to control the voltage limiting unit to provide a substantially constant heating power. Again it has to be noted that this power may be provided for a rather long time (for example more than 10 minutes) and may be much smaller than the power dissipated during protection of the DC link.

According to the invention, the method further comprises: changing heating settings based upon commands from a user interface. It may be possible that the controller inside the wind turbine facility may have a user interface into which specific heating settings may be input. For example, the heating may be switched on and off and/or a heating temperature may be set.

According to an embodiment of the invention, the method further comprises: controlling a blower for distributing the heated air inside the wind turbine facility. A blower or fan may be installed near or remote from the voltage limiting unit, which may be switched on, when the voltage limiting is in heating mode and/or which is positioned to distribute heated air. This blower may be installed in a pipe and/or ventilation system, which may be used for uniform heat transfer inside the wind turbine facility.

According to an embodiment of the invention, the method further comprises: estimating and/or measuring a temperature of the resistor and/or of the air heated by the resistor. The voltage limiting unit may be controlled such that the estimated and/or measured temperature of the resistor and/or the air heated by the resistor is equal to a desired heating temperature.

It may be possible that the heating temperature is sensed with a sensor either positioned near the resistor or in the air heated with the resistor. This measured temperature may be used for closed loop control of the heating temperature.

It also may be possible to determine the temperature of the resistor and/or of the heated air with a thermal model, which may be a set of equations encoded into the controller modeling the behavior of the voltage limiting unit and/or the heating system. It has to be noted that the temperature of the resistor and/or its heating power may be controlled by switching a semiconductor switch of the voltage limiting unit on and off.

According to an embodiment of the invention, the method further comprises: when the voltage in the DC link is above a threshold voltage, controlling the voltage limiting unit such that electrical energy is dissipated into heat until the DC link voltage has fallen below the threshold voltage, independently of the heating settings. When the voltage limiting unit is in heating mode and a need for protection arises (because due to a low voltage ride through), the voltage limiting unit is switched from heating mode into protection mode, in which much more power may be dissipated and/or the temperature of the resistor may rise much higher than during the heating mode.

According to the invention, the DC link is charged by a grid side converter of the wind turbine facility with power from an electrical grid. It may be possible that the voltage limiting unit is switched into heating mode, even when no power is provided by the wind turbine generator. The heating power may be supplied by the grid the wind turbine facility is connected to.

Only the grid side converter may have to be active for heating. Furthermore, the DC link voltage control, which may be necessary to hold the DC link at a constant value, when the VLU is turned on, is usually done by the grid side converter. Thus, the control method of the grid side converter may not have to be modified for heating. It also may be possible that the DC link voltage is lower than during a normal operation of the overall converter, when heating is performed with only the grid side converter.

Since only the grid side converter is necessary for performing the heating method, the voltage limiting unit may be used already in an early state of the commissioning of the wind turbine facility, for example, when the generator side converter, the nacelle and/or the wind turbine are not yet installed.

According to an embodiment of the invention, the DC link is charged by a generator side converter of the wind turbine facility. Alternatively or additionally it may be possible to provide the power for heating from the generator side, i.e. from wind power. For example, this may be done during service of the wind power facility or for providing a permanent heating, which, for example, may be used for protecting devices in the interior of the wind turbine tower from cold or humidity.

A further aspect of the invention relates to a heating system for a wind turbine facility, which heating system comprises a voltage limiting unit as described in the above and the below and a controller adapted for controlling the electrical converter and the voltage limiting unit as described in the above and the below. For example, it may be possible to add a heating function to the controller of the grid side converter. For example, this heating function may be activated during commissioning of the wind turbine facility, when the grid side converter has been installed.

According to an embodiment of the invention, the heating system further comprises a pipe system which is interconnected with the voltage limiting unit, such that heated air is conducted by the pipe system within the wind turbine facility. The pipe system may be used for heat propagation inside the wind turbine tower.

A further aspect of the invention relates to a wind turbine facility which comprises a wind turbine tower, in which the converter, the DC link and the voltage limiting unit are arranged and which comprises a heating system as described in the above and in the below. The voltage limiting unit may be used for heating an interior of the wind turbine tower.

Other possibilities are to heat a building near the wind turbine tower with a voltage limiting unit that is positioned remote from the DC link inside the building.

According to an embodiment of the invention, a housing (which may comprise at least the resistor) of the voltage limiting unit is arranged on a lower level as a housing of the converter and/or the DC link in the wind turbine tower. The converter may be placed in one of the lower levels of the wind turbine tower to keep the center of gravity of the tower close to ground and/or to ensure a small head mass. The voltage limiting unit may be placed on a lower level (for example the basement). With thermal convection, the levels above the voltage limiting unit may be heated passively.

It may be possible that the voltage limiting unit and its housing are positioned remote from the DC link. The resistor may be connected via cables to the DC link which may allow to place the resistor anywhere in the wind turbine tower, for example to maximize the passive heating by thermal convection. For example, the cables interconnecting the resistor of the voltage limiting unit with the DC link may be longer than 5 m.

A further aspect of the invention relates to a use of a voltage limiting unit for heating an interior of a wind turbine facility, wherein the voltage limiting unit comprises a resistor adapted for dissipating electrical energy into heat for reducing a voltage in the DC link, when the voltage is above a threshold voltage, and wherein the voltage limiting unit is controlled such that the resistor generates heat according to defined ambient heating settings, when the voltage is below the threshold voltage.

In particular, when the wind turbine facility is installed offshore, it is placed in a rough environment. An additional heating system for the whole wind turbine facility is usually not foreseen, because during runtime it is usually not necessary. Usually, temperature critical devices are capsuled in cabinets with their own micro climate. The wind turbine tower itself may be of iron or cement made without any insulation. Usually, a permanent heating is not necessary because the wind turbine facility runs without any service personnel under normal circumstances.

However, during commissioning or during service operations it may be advantageous to have a heating system. With the use of the voltage limiting unit as heating device described above and below, a heating of a wind power facility may be possible without the necessity of any additional components.

It has to be understood that features of the method as described in the above and in the following may be features of the heating system, the wind turbine facility and the use as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
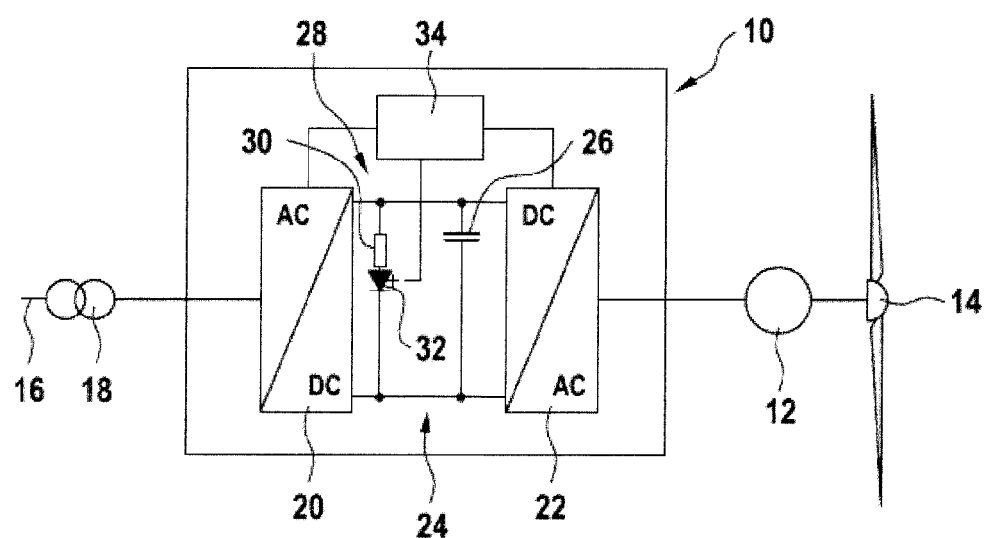
FIG. 1 schematically shows a circuit diagram for a wind turbine facility according to an embodiment of the invention.

FIG. 1 shows an electrical converter 10, which is adapted for converting electrical power from a generator 12, which is driven by a wind turbine 14, into electrical power supplied to an electrical grid 16. It may be possible that a transformer 18 is arranged between the converter 10 and the grid 16.

The converter 10 comprises a grid side converter 20 and a generator side converter 22, which are interconnected by a DC link 24, which may comprise one or more DC link capacitors 26.

During normal operation, the generator side converter 22 rectifies an AC voltage into a to DC voltage to be supplied to the DC link and the grid side converter 20 converts the voltage of the DC link into a further AC voltage to be supplied to the grid. In this case, power flows from the generator 12 to the grid 16. During a low voltage ride through, i.e. a voltage drop in the grid, it may be possible that the power flow inside the grid side converter 20 becomes lower or even may be reversed. In this case, the DC link voltage starts to rise and above a threshold voltage has to be limited.

Therefore, a voltage limiting unit 28 is connected in parallel to the DC link capacitor 26. The voltage limiting unit 28 comprises a resistor 30 and a semiconductor switch 32 connected in series. When the semiconductor switch 32 (such as a thyristor) is opened, a current starts to flow though the resistor 30 which is supplied from the voltage in the DC link capacitor 26. In the resistor 30, the electrical energy is transformed into heat energy, which, for example, may be dissipated by cooling fins. In such a way, the DC link voltage may be lowered by switching on the voltage limiting unit 28.

It may be possible that the DC link 24 is a split DC link with two DC link capacitors 26 connected in series. In this case, the voltage limiting unit 28 may comprise a series connection of a resistor 30 and a semiconductor switch 32 connected in parallel to each DC link capacitor 26. The voltage limiting unit 28 may have a positive and a negative half. Each half may be connected to a neutral point of the DC link 24 by the respective semiconductor switch 32.

The converters 20, 22 and the voltage limiting unit 28 are controlled by a controller 34, which may comprise several subcontrollers, for example a subcontroller for the grid side converter 20 and a subcontroller for the generator side converter 22.

The controller 34 may monitor the DC link voltage and may switch the voltage limiting unit 28 on to lower the DC link voltage, when it rises above a threshold voltage. If a voltage above the threshold voltage is detected, the semiconductor switch 32 is switched on and the resistor 30 may be interconnected to the capacitor 26 as long as the DC link voltage is above the threshold voltage. This may be seen as a protection mode of the voltage limiting unit 28.

Furthermore, as will be explained in detail below, the controller 34 may control the voltage limiting unit 28 in such a way that the voltage limiting unit 28 generates heat according to defined heating settings that may be stored in the controller such that the voltage limiting unit may be used as a heating device. This may be seen as a heating mode of the voltage limiting unit 28.

Figure 2:
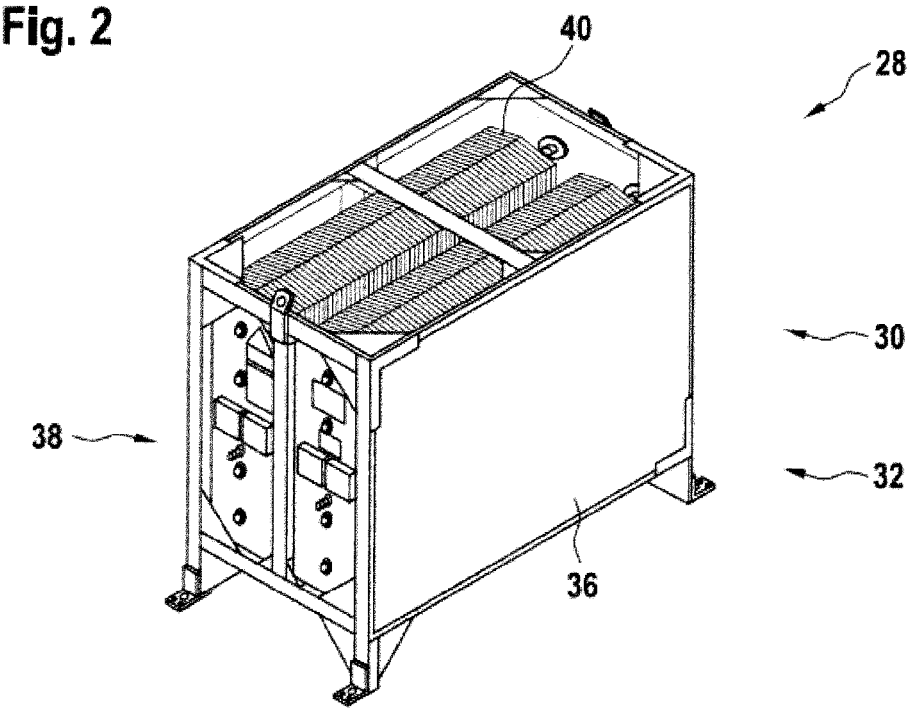
FIG. 2 shows a perspective view of a voltage limiting unit for a wind turbine facility according to an embodiment of the invention.

FIG. 2 shows a voltage protection unit 28, which comprises a housing 36 in which the one or more resistors 30 and one or more semiconductor switches 32 are accommodated. The one or more resistors 30 and one or more semiconductor switches 32 may be connected via connectors 38 provided by the housing with the DC link 24 and the controller 34.

The one or more resistors 30 are thermally connected to cooling fins 40 inside the housing 36. The housing 36 has openings, which allow an air stream through the fins 40, which may be driven by thermal convection. The heat from the resistor(s) 30 may be dissipated into the air, which is heated while cooling the resistor(s) 30. When the resistor(s) 30 are constantly heated with a moderate temperature, the heated air may be used for heating rooms/spaces, in which the voltage limiting unit 28 is installed.

Figure 3:
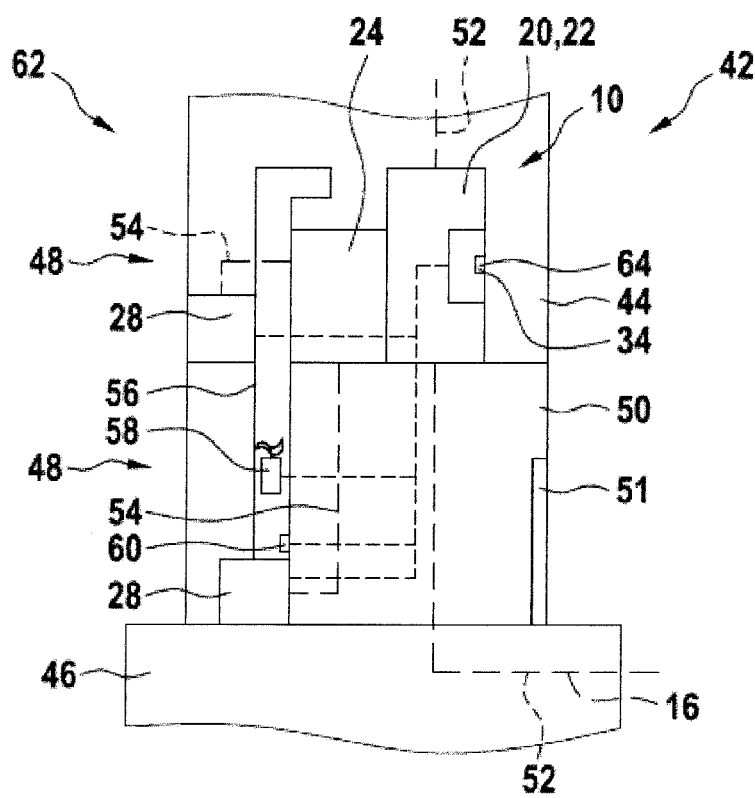
FIG. 3 schematically shows a wind turbine facility according to an embodiment of the Invention.
Figure 4:
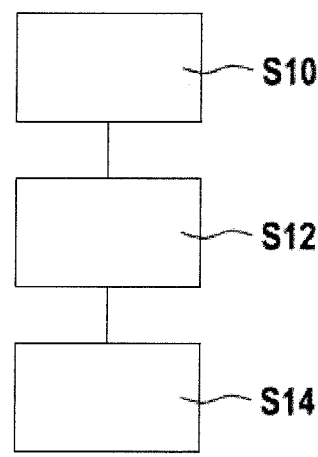
FIG. 4 shows a flow diagram for a method for heating of a wind turbine facility according to an embodiment of the invention.

FIG. 3 shows a wind turbine facility 42, which comprises a wind turbine tower 44 erected on a basement 46. The basement 46 may comprise a concrete block, while the wind turbine tower 44 may comprise a steel pipe or a concrete pipe, which on its tip carries a nacelle with the generator 12 and the wind turbine 14. The wind turbine facility 42 comprises several levels and/or floors 48, which may be accessed via a door 51 in the wind turbine tower 44 and/or which may separate the interior 50 of the wind turbine tower 44 into different spaces and/or rooms.

For example, a level 48 may house the grid side converter 20, the generator side converter 22, which are connected via electrical cables 52 to the grid 16 and to the generator 12. Also the controller may be positioned at the same level 48.

FIG. 3 shows two different possible positions for the voltage limiting unit 28. The voltage limiting unit 28 may be housed on the same level 48 or on a different level, in particular on a level below the level, in which other converter components 20, 22, 24 are installed. In both cases, the voltage limiting unit 28 may be connected via an electrical cable 54 with the DC link 24.

When the voltage limiting unit 28 is operated in a heating mode, it may heat air in the wind turbine tower 44 to a temperature comfortable for persons commissioning the wind turbine facility 42 or maintaining the wind turbine facility 42. For example, the interior 50 of the wind turbine facility 42 or at least parts of it may be heated to a temperature about 20° C. It also may be possible that the heating mode of the voltage limiting unit 28 is used to prevent the interior 50 of the wind turbine facility 42 or at least parts of it from freezing. In such a case, the air may be heated to about 2°.

One possibility is to use the voltage limiting unit 28 for heating by thermal convection. In this case, only components already installed in a conventional wind turbine facility 42 may be used for heating. Only the programming of the controller 34 may be changed.

When the voltage limiting unit 28 is placed on the basement and/or the lowest level 48, the complete interior 50 of the wind turbine tower 44 may be heated by convection.

Another possibility is to install a pipe/ventilation system 56 in the wind turbine facility, which comprises pipes for distributing heated air inside the wind turbine tower 44. For example, heated air from the voltage limiting unit 28 may enter the pipe/ventilation system 56 by thermal convection and may be distributed to other levels 48.

A blower 58 may be installed in the pipe/ventilation system 56 for actively distributing the heated air with the pipe/ventilation system 56. The blower 58 may be turned on, when the voltage limiting unit 28 is used in heating mode and/or protection mode. The blower 58 may be turned off, when the voltage limiting unit 28 is turned off.

Furthermore, a temperature sensor 60 may be installed in the pipe/ventilation system 56 and/or at the resistor 30. The signal from the temperature sensor 60 may be evaluated by the controller 34 for controlling the voltage limiting unit 28 in the heating mode and/or the protection mode.

The voltage limiting unit 28, the blower 58, the temperature sensor 50, the pipe/ventilation system 56 and the controller 34 may be seen as a heating system 62 of the wind turbine facility 42.

FIG. 3 shows a flow diagram for a method that may be performed by the heating system 62 under the control of the controller 34.

In step S10, a person inside the wind turbine tower 44 changes heating settings with commands from a user interface 64 that, for example, may be provided by the controller 34.

For example, the person may simply switch on the heating system 62 or may change a temperature that should be produced by the heating system 62. The heating settings may comprise an operation state of the heating system 62 (on/off), a desired resistor temperature, a desired air temperature, a desired heating power, an operation state of the blower 58, etc.

In step S12, the heating system 62 starts to heat air inside the wind turbine facility 42 with heat generated by the voltage limiting unit 28.

Since the heat is generated from electrical energy, the DC link 24 has to be charged. The DC link may already be charged, when the converter 10 is operating, i.e. converting electrical energy from the generator 12 into electrical energy to be supplied to the grid 16. The DC link 24 is then charged by the generator side converter 22.

Otherwise, when the DC link 24 is not charged, it has to be charged. This may be done with the grid side converter 22 with power from an electrical grid 16. In this context it has to be noted that the heating system 62 may be operated when the wind turbine 14 is not working and even in the case, when the wind turbine 14 and other parts of the wind turbine facility 42 are not yet installed.

For example, it may be possible to heat the interior 50 of the wind turbine facility 42 during commissioning and/or maintenance.

For controlling the heating system 62, the controller may estimate a temperature of the resistor 30 and/or of the air heated by the resistor 30. This may be performed with a model of the voltage limiting unit 28 and/or further components of the heating system 62.

It also may be possible that the controller 34 measures the temperature of the resistor 30 and/or of the air heated by the resistor 30. This may be performed with aid of the sensor 60.

Based on this estimated/measured temperature, the controller 34 may control a power supply of the voltage limiting unit 28 such that the estimated and/or measured temperature of the resistor 30 and/or the air heated by the resistor is equal to a desired temperature. For example, the controller may switch the semiconductor switch 32 on and off to limit the power dissipated by the resistor.

Furthermore, it may be possible that the heating power of the resistor 30 is controlled to be a defined heating power (for example set in the heating settings). For example, this heating power may be set to a constant value.

In step S12, also the blower 58 for distributing the heated air inside the wind turbine facility 42 may be controlled. For example, the blower 58 may be switched on, when demanded by the heating settings of the controller 34 and/or when an air temperature inside the pipe/ventilation system 56 is getting too high.

In step S14, the controller 34 detects that the voltage in the DC link 24 is above a threshold voltage. In this case, the voltage limiting unit 28 is used in protection mode. To fast dissipate energy and to fast lower the DC link voltage, the heating power of the resistor and/or its temperature are not (or nearly not) limited any more. In protection mode it may be that the resistor 30 reaches a temperature of several 100° C. It may be that also in protection mode, the heat and/or temperature generated by the resistor 30 is controlled to protect the voltage limiting device 28. During the protection mode, the temperature of the resistor 30 may be estimated and/or measured by the sensor 60 and used for protecting the resistor 30 from a damage.

However, the control settings of the protection mode may be much higher than in the heating mode. For example, the maximal temperature of the resistor during the protection mode may be 500° C., wherein the heating temperature during the heating mode may be between 10° C. and 80° C.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter
12 generator
14 wind turbine
16 electrical grid
18 transformer
20 grid side converter
22 generator side converter
24 DC link
26 DC link capacitor
28 voltage limiting unit
30 resistor
32 semiconductor switch
34 controller
36 housing
38 connectors
40 cooling fins
42 wind turbine facility
44 wind turbine tower
46 basement
48 level
50 interior of wind turbine facility
51 door
52 electrical cable
54 electrical cable
56 pipe/ventilation system
58 blower
60 temperature sensor
62 heating system

The invention claimed is:

1. A method for heating a wind turbine facility, the method comprising:
charging a DC link of an electrical converter connected with a wind turbine of the wind turbine facility;
heating air inside the wind turbine facility with heat generated by a voltage limiting unit interconnected with the DC ink, which comprises a resistor adapted for dissipating electrical energy into heat for reducing a voltage in the DC link, when the voltage is above a threshold voltage;
wherein the voltage limiting unit is controlled, such that the voltage limiting unit generates heat according to heating settings defined in a controller of the voltage limiting unit;
wherein heating settings are changed based upon commands from a user interface;
wherein the DC link is charged by a grid side converter of the wind turbine facility with power from an electrical grid.

2. The method of claim 1,
wherein the voltage limiting unit is controlled, such that the resistor is heated to a defined heating temperature.

3. The method of claim 2,
wherein the heating temperature is lower than a maximal temperature, which maximal temperature is used for limiting a temperature of the resistor during reducing the voltage in the DC link, when the voltage is above a threshold voltage; and/or
wherein the voltage limiting unit is controlled, such that the heating temperature of the resistor is between 10° C. and 80° C.

4. The method of claim 2,
wherein the voltage limiting unit is controlled, such that the resistor generates heat with a defined heating power; and/or
wherein the voltage limiting unit is controlled, such that the resistor has a constant heating power.

5. The method of claim 2, further comprising:
controlling a blower for distributing the heated air inside the wind turbine facility.

6. The method of claim 1,
wherein the heating temperature is lower than a maximal temperature, which maximal temperature is used for limiting a temperature of the resistor during reducing the voltage in the DC link, when the voltage is above a threshold voltage; and/or
wherein the voltage limiting unit is controlled, such that the heating temperature of the resistor is between 10° C. and 80° C.

7. The method of claim 6,
wherein the voltage limiting unit is controlled, such that the resistor generates heat with a defined heating power; and/or
wherein the voltage limiting unit is controlled, such that the resistor has a constant heating power.

8. The method of claim 6, further comprising:
controlling a blower for distributing the heated air inside the wind turbine facility.

9. The method of claim 1,
wherein the voltage limiting unit is controlled, such that the resistor generates heat with a defined heating power; and/or
wherein the voltage limiting unit is controlled, such that the resistor has a constant heating power.

10. The method of claim 9,
wherein the voltage limiting unit is controlled, such that the resistor generates heat with a defined heating power; and/or
wherein the voltage limiting unit is controlled, such that the resistor has a constant heating power.

11. The method of claim 9, further comprising:
controlling a blower for distributing the heated air inside the wind turbine facility.

12. The method of claim 1, further comprising:
controlling a blower for distributing the heated air inside the wind turbine facility.

13. The method of claim 12, further comprising:
controlling a blower for distributing the heated air inside the wind turbine facility.

14. The method of claim 1, further comprising:
estimating and/or measuring a temperature of the resistor and/or of the air heated by the resistor;
controlling the voltage limiting unit such that the estimated and/or measured temperature of the resistor and/or the air heated by the resistor is equal to a desired temperature.

15. The method of claim 1, further comprising:
when the voltage in the DC link is above a threshold voltage, controlling the voltage limiting unit such that electrical energy is dissipated into heat until the DC link voltage has fallen below the threshold voltage, independently of the heating settings.

16. The method of claim 1,
wherein the DC link is charged by a generator side converter of the wind turbine facility.

17. A heating system for a wind turbine facility, the heating system comprising:
a voltage limiting unit electrically interconnected to a DC link of an electric converter of the wind turbine facility with a resistor for dissipating electrical energy from the DC link into heat;
a controller adapted for controlling the electrical converter and the voltage limiting unit, the controller operable to direct the heating system to:
charge the DC link of the electrical converter connected with a wind turbine of the wind turbine facility;
heat air inside the wind turbine facility with heat generated by the voltage limiting unit interconnected with the DC ink, which comprises the resistor adapted for dissipating electrical energy into heat for reducing a voltage in the DC link, when the voltage is above a threshold voltage;
wherein the voltage limiting unit is controlled, such that the voltage limiting unit generates heat according to heating settings defined in the controller of the voltage limiting unit;
wherein heating settings are changed based upon commands from a user interface;
wherein the DC link is charged by a grid side converter of the wind turbine facility with power from an electrical grid.

18. A wind turbine facility, comprising:
a wind turbine tower, in which the converter, the DC link and the voltage limiting unit are arranged; and
a heating system according to claim 9.

19. The heating system of claim 18, further comprising:
a pipe system interconnected with the voltage limiting unit, such that heated air from the voltage limiting unit is conducted by the pipe system within the wind turbine facility.

20. The wind turbine facility of claim 18,
wherein the resistor of the voltage limiting unit is arranged on a lower level as the converter and/or the DC link in the wind turbine tower.

* * * * *